(12) United States Patent
Lee

(10) Patent No.: US 11,926,139 B2
(45) Date of Patent: Mar. 12, 2024

(54) DISPLAY DEVICE

(71) Applicant: SAMSUNG DISPLAY CO., LTD., Yongin-si (KR)

(72) Inventor: Jung Hun Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 193 days.

(21) Appl. No.: 17/235,087

(22) Filed: Apr. 20, 2021

(65) Prior Publication Data

US 2021/0323269 A1 Oct. 21, 2021

(30) Foreign Application Priority Data

Apr. 20, 2020 (KR) .......................... 10-2020-0047633

(51) Int. Cl.
*B32B 7/12* (2006.01)
*G06F 1/16* (2006.01)

(52) U.S. Cl.
CPC .............. *B32B 7/12* (2013.01); *G06F 1/1652* (2013.01); *B32B 2262/101* (2013.01); *B32B 2264/02* (2013.01); *B32B 2264/1021* (2020.08); *B32B 2264/202* (2020.08); *B32B 2264/204* (2020.08); *B32B 2307/51* (2013.01); *B32B 2457/20* (2013.01)

(58) Field of Classification Search
CPC ... B32B 7/12; B32B 2307/51; B32B 2457/20; B32B 2262/101; B32B 2457/204; B32B 5/18; B32B 27/065; B32B 2457/202; B32B 2457/206; B32B 27/08; B32B 27/281; B32B 27/36; B32B 2264/02; B32B 2264/1021; B32B 2264/202; B32B 2264/204; G06F 1/1652; G06F 1/1616; G06F 1/1656; G09F 9/301; G02F 1/13394; G02F 1/13398
See application file for complete search history.

(56) References Cited

U.S. PATENT DOCUMENTS

| 2016/0226017 | A1* | 8/2016 | Nam ...................... H01L 51/524 |
| 2017/0084673 | A1* | 3/2017 | Lee ...................... H01L 51/5237 |
| 2017/0153668 | A1* | 6/2017 | Jang ...................... G06F 1/1643 |
| 2018/0192527 | A1 | 7/2018 | Yun et al. |

FOREIGN PATENT DOCUMENTS

| KR | 10-1672467 | 11/2016 |
| KR | 10-2017-0013661 | 2/2017 |
| KR | 10-2018-0079094 | 7/2018 |
| KR | 10-2018-0079096 | 7/2018 |

* cited by examiner

*Primary Examiner* — John D Freeman
(74) *Attorney, Agent, or Firm* — F. Chau & Associates, LLC

(57) ABSTRACT

A display device includes: a display panel; a first member disposed on the display panel; a second member disposed on the display panel; a first adhesive layer disposed between the display panel and the first member; and a second adhesive layer disposed between the display panel and the second member. The spacers are disposed in the second adhesive layer.

19 Claims, 19 Drawing Sheets

FIG.2
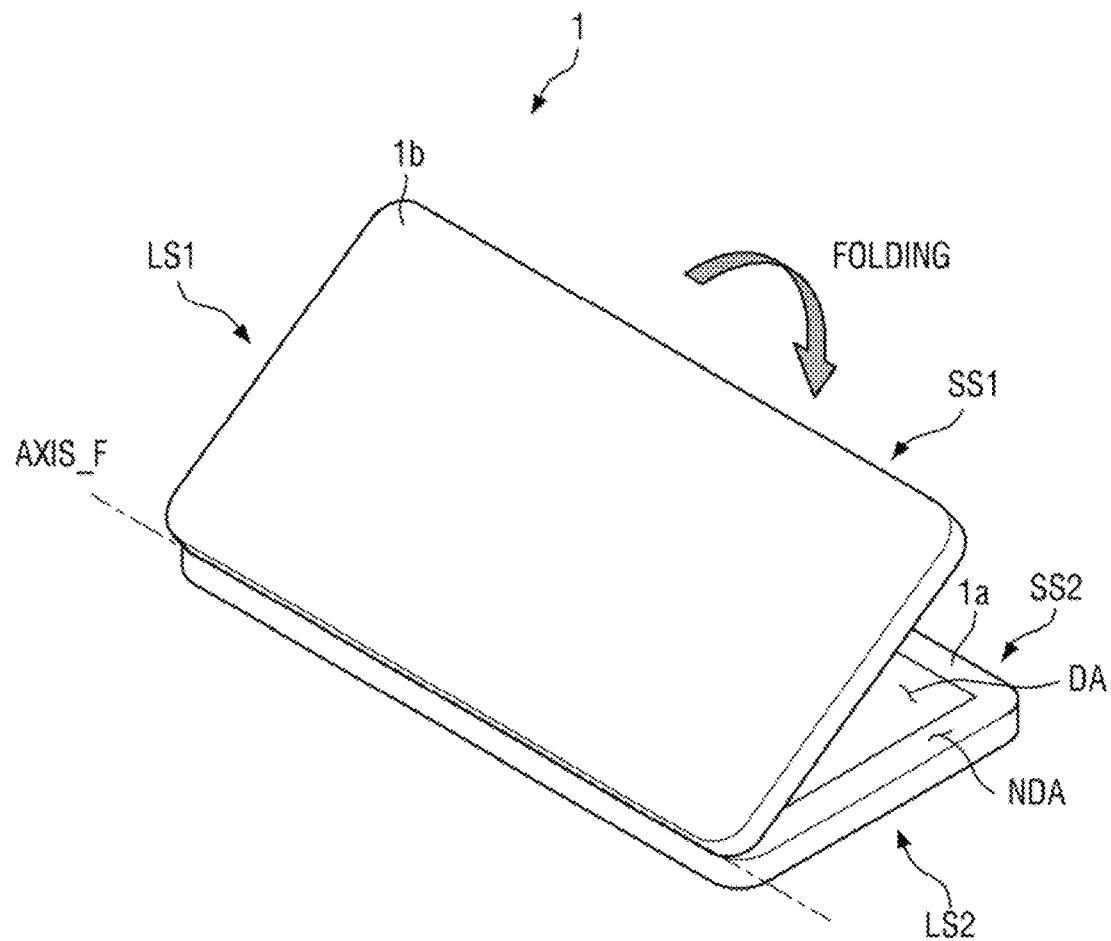
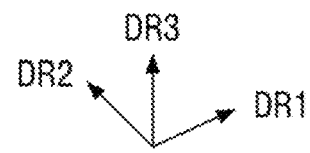

DISPLAY DEVICE

CROSS-REFERENCE TO RELATED APPLICATION

This application claims priority under 35 U.S.C. § 119 to Korean Patent Application No. 10-2020-0047633, filed on Apr. 20, 2020, the disclosure of which is incorporated by reference herein in its entirety.

TECHNICAL FIELD

The present invention relates to a display device, and more particularly, to a foldable display device.

DISCUSSION OF THE RELATED ART

Currently, display devices for displaying images are becoming increasingly used. Further, display devices having a small volume or thickness and a relatively large display screen have increasingly become widespread, and flexible display devices (such as foldable or bendable display devices) that can be folded and unfolded to provide a larger display scree when compared to being folded, have been under development.

A typical flexible display device may have a stack structure having multiple members stacked therein, and may include optically clear bonding members that couple the multiple members to one another.

SUMMARY

According to an embodiment of the present invention, a display device includes: a display panel; a first member disposed on the display panel; second member disposed on the display panel; a first adhesive layer disposed between the display panel and the first member; and a second adhesive layer disposed between the display panel and the second member. The spacers are disposed in the second adhesive layer.

In an embodiment of the present invention, the first and second adhesive layers each include a pressure sensitive adhesive.

In an embodiment of the present invention, the second adhesive layer has a lower light transmittance than that of the first adhesive layer.

In an embodiment of the present invention, the display device further includes: a folding area; a first non-folding area disposed on a first side of the folding area; a second non-folding area disposed on a second side of the folding area; a first surface; and a second surface that is opposite to the first surface of the display device. The first member has a first surface that faces the first adhesive layer and a second surface that is opposite to the first surface of the first member. The second member has a first surface that faces the second adhesive layer and a second surface that is opposite to the first surface of the second member, and the first and second surfaces of the display device are respectively the second surfaces of the first and second members.

In an embodiment of the present invention, the display device is configured to fold, and when the display device is in a folded state, the first surfaces of the first and second non-folding areas face each other.

In an embodiment of the present invention, when the display device is in the folded state, a side of the display panel is disposed on the inside of a side of the first member, in the first non-folding area.

In an embodiment of the present invention, when the display device is in the folded state, a thickness of the second adhesive layer is greater in the first non-folding area than in the folding area.

In an embodiment of the present invention, the spacers have a spherical shape, and when the display device is in the folded state, a diameter of each of the spacers is about 60% to about 88% of the thickness of the second adhesive layer in the first non-folding area.

In an embodiment of the present invention, the second adhesive layer has a first surface that faces the display panel and a second surface that is opposite to the first surface of the second adhesive layer, and when the display device is in the folded state, the spacers are in contact with the first and second surfaces of the second adhesive layer, in the folding area.

In an embodiment of the present invention, the first member includes an upper functional member, a third adhesive layer, and a window. The upper functional member is disposed on the display panel. The third adhesive layer is disposed on the upper functional member, and the window is disposed on the third adhesive layer.

In an embodiment of the present invention, the second member includes a film layer, a fourth adhesive layer, and a cushion layer. The film layer is disposed on the display panel. The fourth adhesive layer is disposed on the film layer, and the cushion layer is disposed on the fourth adhesive layer.

In an embodiment of they present invention, the spacers are further disposed in the fourth adhesive layer.

In an embodiment of the present invention, the display device is configured to fold, and when the display device is in a folded state, the second surfaces of the first and second non-folding areas face each other.

In an embodiment of the present invention, the display device further includes: a first folding area; a second folding area, a first non-folding area disposed between the first and second folding areas; a second non-folding area spaced apart from the first non-folding area by the first folding area; a third non-folding area spaced apart from the first non-folding area by the second folding area; a first surface; and a second surface that is opposite to the first surface of the display device. The first member has a first surface that faces the first adhesive layer and a second surface that is opposite to the first surface of the first member. The second member has a first surface that faces the second adhesive layer and a second surface that is opposite to the first surface of the second member, and the first and second surfaces of the display device are respectively the second surfaces of the first and second members.

In an embodiment of the present invention, the first surfaces of the first and second non-folding areas face each other, and the first surfaces of the first and third non-folding areas face each other.

In an embodiment of the present invention, the first surfaces of the first and second non-folding areas face each other, and the second surfaces of the first and third non-folding areas face each other.

In an embodiment of the present invention, the spacers include spherical plastic beads, spherical silica, rod-shaped glass fiber, and/or a plastic-based material, and the plastic-based material may include a polymer or crosslinked product of a divinylbenzene monomer, a benzoguanamine monomer, and a styrene monomer.

According to an embodiment of the present invention, a display device includes: a display panel; a first member disposed on the display panel; a second member disposed on the display panel; a first adhesive layer disposed between the display panel and the first member; and a second adhesive layer disposed between the display panel and the second member. The spacers are disposed in the second adhesive layer. The first and second adhesive layers each include a pressure sensitive adhesive. The display device is configured to fold, and when the display device is in a folded state, a thickness of the second adhesive layer is smaller in curved parts of the display device than in non-curved parts of the display device. A diameter of each of the spacers is about 60% to about 96% of the thickness of the second adhesive layer in the non-curved parts of the display device.

In an embodiment of the present invention, the second adhesive layer has a first surface that faces the display panel and a second surface that is opposite to the first surface of the second adhesive layer. When the display device is in the folded state, the spacers are in contact with the first and second surfaces of the second adhesive layer, in the folding area.

In an embodiment of the present invention, the spacers are in contact with one another.

BRIEF DESCRIPTION OF THE DRAWINGS

The above and other embodiments and features of the present invention will become more apparent by describing in detail embodiments thereof with reference to the attached drawings, in which:

FIG. 2 is a perspective view illustrating a folding operation of the display device of FIG. 1;

DETAILED DESCRIPTION OF THE EMBODIMENTS

Figure 1:
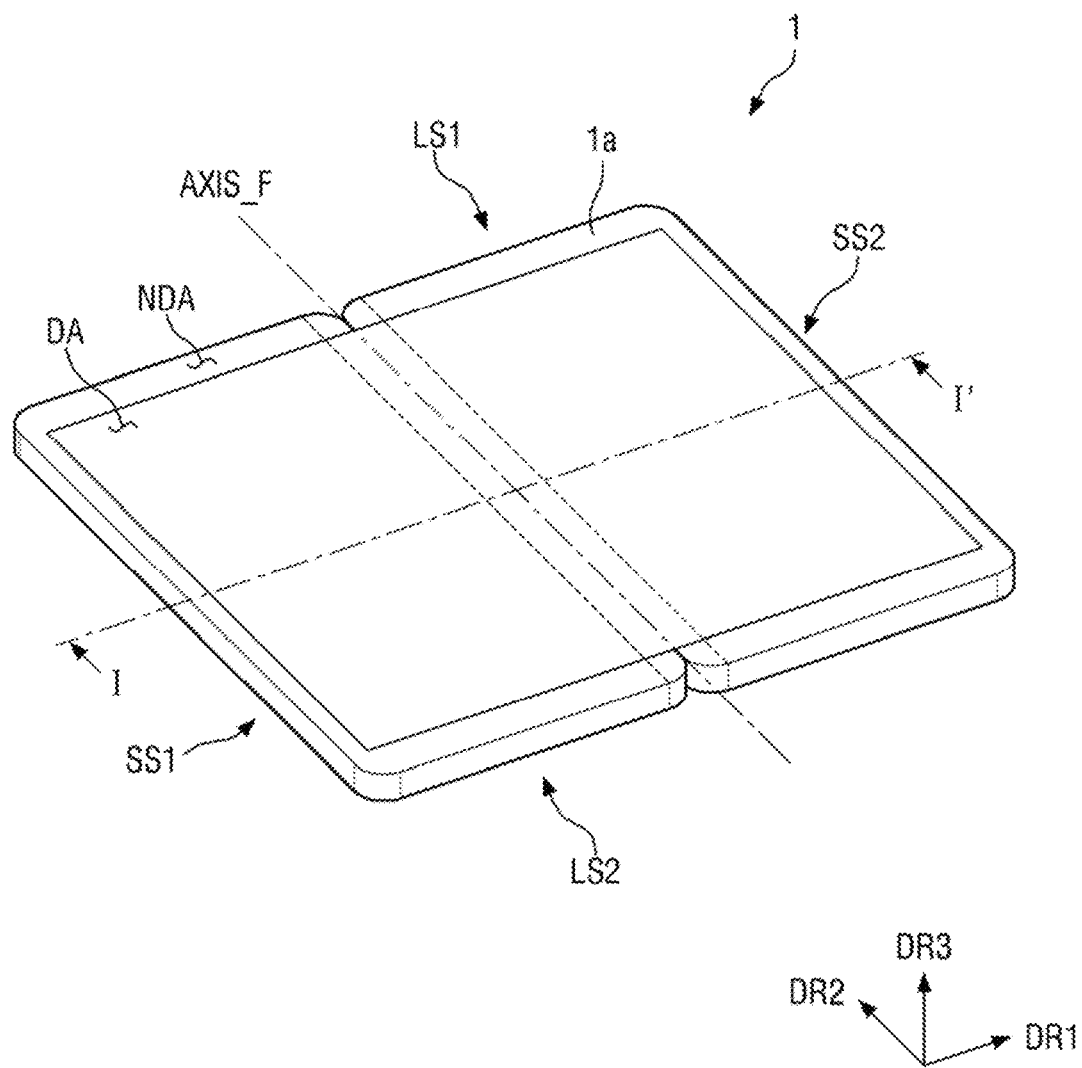
FIG. 1 is a perspective view of a display device according to an embodiment of the present invention.

Specific structural and functional descriptions of embodiments of the present invention disclosed herein a only for illustrative purposes of the embodiments of the present invention. The present invention may be embodied in many different forms without departing from the spirit and scope of the present invention. Therefore, the embodiments of the present invention are disclosed only for illustrative purposes and should not be construed as limiting the invention.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, no intervening elements are present. Other expressions that explain the relationship between elements, such as "between," "directly between," "adjacent to," or "directly adjacent to," should be construed in the same way.

Throughout the specification, the same reference numerals will refer to the same or like pans, and thus, repetitive descriptions may be omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the spirit and scope of the present invention.

The terminology used herein is for the purpose of describing embodiments of the present invention only and is not intended to be limiting. As used herein, "a" "an," "the," and "at least one" do not denote a limitation of quantity, and are intended to include both the singular and plural, unless the context clearly indicates otherwise. "At least one" is not to be construed as limiting "a" or "an." "Or" means "and/or." As used herein, the term "and/or" includes any and all combinations of one or more of the associated listed items.

Furthermore, spatially relative terms, such as "lower" or "bottom" and "upper" or "top," may be used herein to describe one element's relationship to another element as illustrated in the figures. It will be understood that the spatially relative terms are intended to encompass different orientations of the device in addition to the orientation depicted in the figures. For example, if the device in one of the figures is turned over, elements described as being on the "lower" side of other elements would then be oriented on "upper" sides of the other elements. The example term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The example terms "below" or "beneath" can, therefore, encompass both an orientation of "above" and "below".

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

Embodiments are described herein with reference to cross section illustrations that are schematic illustrations of embodiments of the present invention. As such, variations from the shapes of the illustrations as a result, for example, of manufacturing techniques and/or tolerances, are to be expected. Thus, embodiments of the present invention described herein should not be construed as limited to the particular shapes of regions as illustrated herein but are to include deviations in shapes that result, for example, from manufacturing. For example, a region illustrated or described as flat may, for example, have rough and/or nonlinear features. Moreover, for example, sharp angles that are illustrated may be rounded. Thus, the regions illustrated in the figures are schematic in nature and their shapes are not intended to illustrate the precise shape of a region. In addition, the illustrated regions are not intended to limit the scope of the present invention.

Hereinafter, embodiment of the present invention will be described with reference to the accompanying drawings.

FIG. 1 is a perspective view of a display device according to an embodiment of the present invention.

Referring to FIG. 1, a display device 1 may be a foldable display device. The term "foldable", as used herein, means flexible and encompasses states of being bendable, rollable, and the like. The term "foldable" also encompasses various states of being foldable such as foldable in pail, foldable as a whole, in-foldable, and out-foldable.

The display device 1 may have a folding axis AXIS_F, which extends across the display device 1 in a plan view. For example, the folding axis AXIS_F may extend in a second direction DR2. The display device 1 may be bent along the folding axis AXIS_F.

The display device 1 may have a substantially rectangular shape in a plan view. For example, the display device 1 may have a rectangular shape with right-angled or rounded corners in a plan view. The display device 1 may have four edges (LS1, LS2, SS1, and SS2). The display device 1 may have two long edges, i.e., first and second long edges LS1 and LS2, and two short edges, i.e., first and second short edges SS1 and SS2. For example, the first and second long edges LS1 and LS2 may extend in a first direction DR1, and the first and second short edges SS1 and SS2 may extend in the second direction DR2 crossing the first direction DR1.

As illustrated in FIG. 1, the folding axis AXIS_F may extend in a direction that extends across the first and second long edges LS1 and LS2, for example, in the second direction DR2. In this case, the first and second long edges LS1 and LS2 may be folded. In addition, according to an embodiment of the present invention, the folding axis AXIS_F may extend across the first and second short edges SS1 and SS2, in which case, the first and second short edges SS1 and SS2 may be folded. For convenience, the folding axis AXIS_F will hereinafter be described as extending across the first and second long edges LS1 and LS2. For example, the folding, axis AXIS_F may pass through the centers of the first and second long edges LS1 and LS2, but the present invention is not limited thereto.

Unless specified otherwise, the terms "on", "above", and "top surface" refer to a display direction, the terms "below" and "bottom surface" refer to the opposite direction of the display direction, and the terms "top" (or "upper), "bottom" (or "lower"), "left", and "right" refer to their respective directions with respect to a display surface, as viewed from above the display surface.

The display device 1 may include a display area DA and a non-display area NDA, which is disposed around the display area DA. The display area DA is a region that displays an image, and the non-display area NDA is a region that does not display an image. For example, the display area DA may be located in the middle of the display device 1. When the display device 1 is folded, parts of the display area DA that are divided by the folding axis AXIS_F may be folded. Then, when the display device 1 is unfolded, the display device 1 may display a screen with the parts thereof unfolded. The non-display area NDA may include a pad area, which is connected to a printed circuit board. In the pad area, a plurality of pads may be disposed and may be electrically connected to lead wires of the printed circuit board.

Grooves (e.g., notches) may be formed in parts of the display device 1 where the folding axis AXIS_F meets the first long edge LS1 and the second long edge LS2. For example, hinge members and the like may be coupled to the grooves for switching the state of the display device 1, but the present invention is not limited thereto.

As will be described later with reference to FIG. 3, a folding area FR and first and second non-folding areas NFR1 and NFR2 may be provided on the display device 1, along the folding axis AXIS_F.

For example, the display device 1 may chide the folding area FR, and the first and second non-folding areas NFR1 and NFR2, which are spaced apart from each other by the folding area FR. Further, the folding area FR includes the folding axis AXIS_F. The first non-folding area NFR1 may be disposed on one side, in the first direction DR1, of the folding area FR, and the second non-folding area NFR2 may be disposed on the other side, in the first direction DR1, of the folding area FR.

The folding area FR may be an area that is folded or bent in the folding direction of the display device 1 to have a predetermined curvature when the display device 1 is folded, and the first and second non-folding areas NFA1 and NFA2 may be areas that are not folded, when the display device 1 is folded. The first and second non-folding areas NFR1 and NFR2 may be disposed on flat surfaces that green the same plane together when unfolded, but the present invention is not limited thereto. In addition, the first and second non-folding areas NFR1 and NFR2 may be partially curved.

The display device 1 may have a first surface 1a and a second surface 1b, which is opposite to the first surface 1a. The first surface 1a may be a surface of a first member 200 (of FIG. 3) that is opposite to another surface of the first member 200 that faces a first adhesive layer 410 (of FIG. 3), and the second surface 1b may be a surface of a second member 300 (of FIG. 3) that is opposite to another surface of the second member 300 that faces a second adhesive layer 420.

The folding of the display device 1 will hereinafter be described.

FIG. 2 is a perspective view illustrating a folding operation of the display device of FIG. 1.

Referring to FIG. 2, when an external force is applied along the folding direction of the display device 1 (e.g., a vertical direction or the third direction DR3) during the folding operation of the display device 1, the display device 1 is bent or folded in the folding area FR, and the first non-folding area NFR1 may move or rotate about the folding direction of the display device 1 and may thus overlap with, or face, the second non-folding area NFR2.

The display device 1 may be folded in the folding area FR so that the first surfaces 1a of the first and second non-folding areas NFR1 and NFR2 may face each other.

For example, FIG. 2 illustrates that the display device 1 is in-folded so that the first surfaces 1a of the first and second non-folding areas NFR1 and NFR2 may face each other, and that the second surfaces 1b of the first and second non-folding areas NFR1 and NFR2 may be oriented in opposite directions of each other. However, the present invention is not limited thereto. For example, the display device 1 may be out-folded such that the second surfaces 1b of the first and second non-folding areas NFR1 and NFR2 may be folded to face each other, and the first surfaces 1a of the first and second non-folding areas NFR1 and NFR2 may be oriented in opposite directions of each other.

Figure 3:
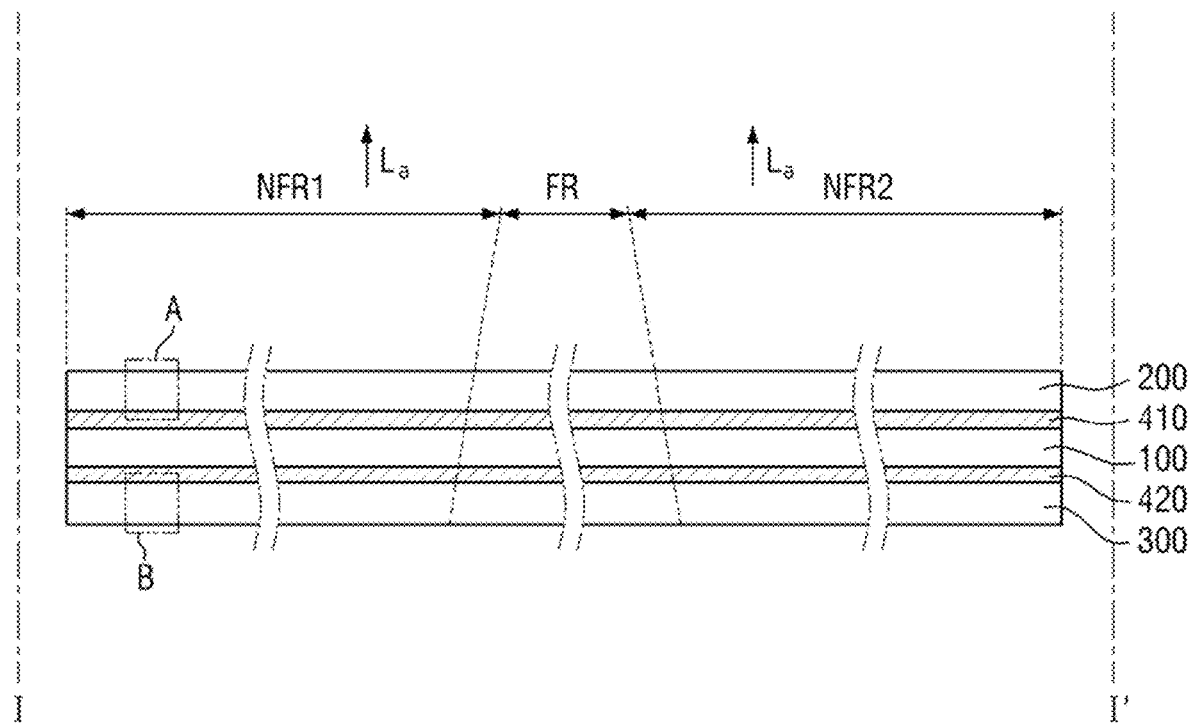
FIG. 3 is a cross-sectional view taken along line I-I' of FIG. 1.
Figure 4:
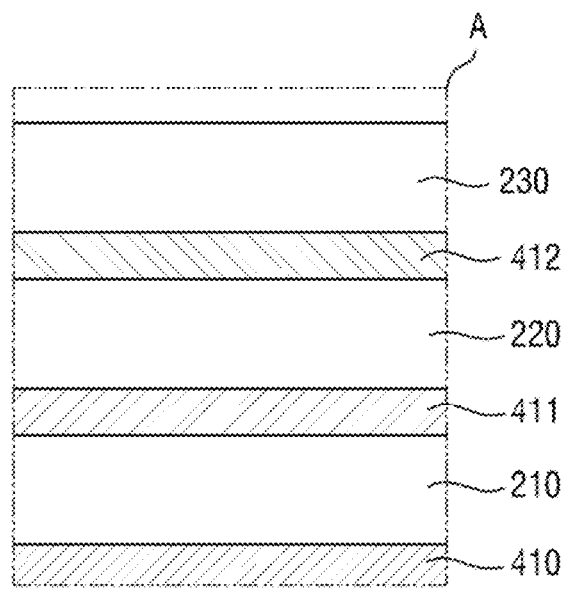
FIG. 4 is an enlarged cross-sectional view illustrating an area A of FIG. 3.
Figure 5:
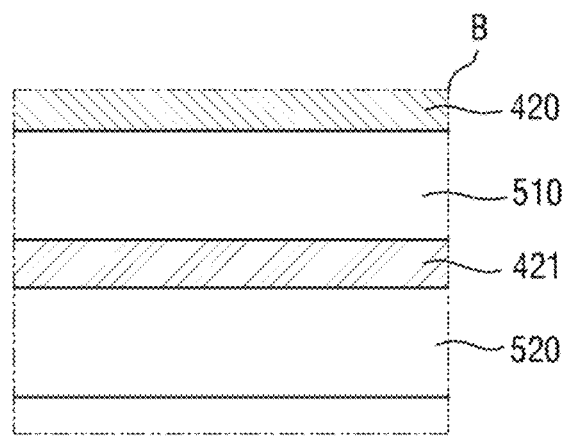
FIG. 5 is an enlarged cross-sectional view illustrating an area B of FIG. 3.
Figure 6:
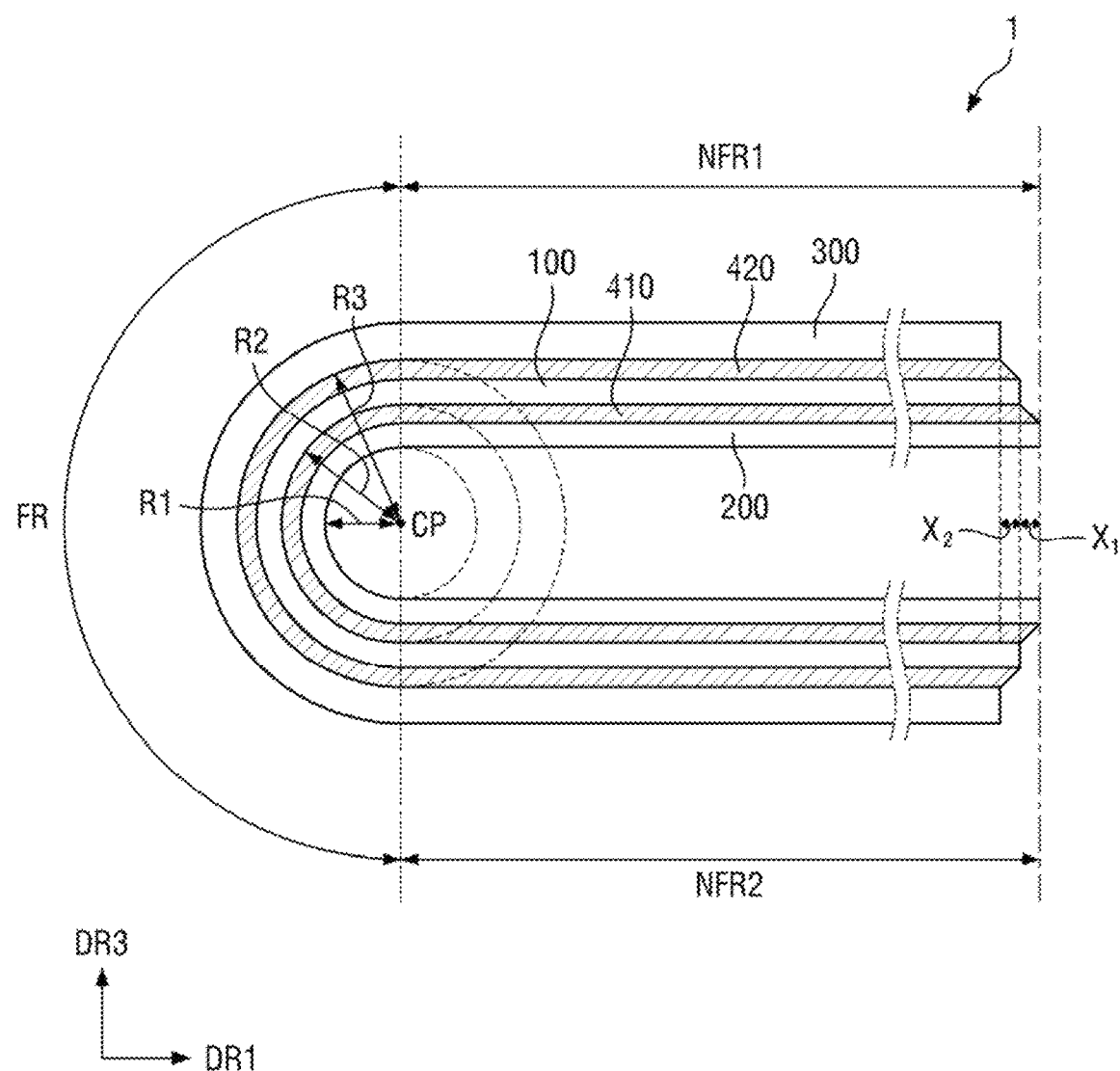
FIG. 6 is a cross-sectional view of the display device of FIG. 1 in its folded state.
Figure 7:
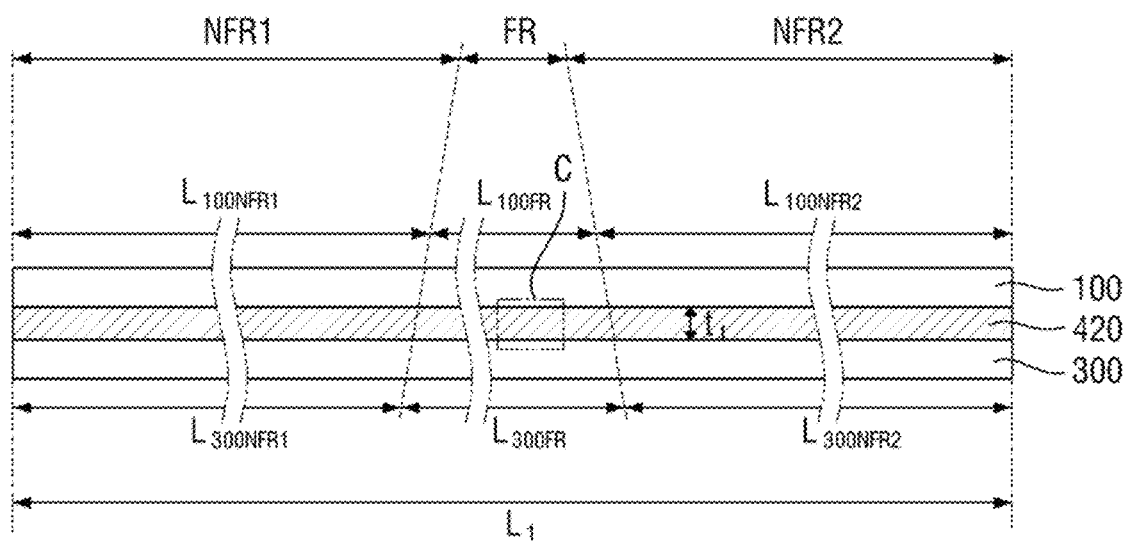
FIG. 7 is an enlarged cross-sectional view illustrating a display panel, a second adhesive layer, and a second member of FIG. 3.
Figure 8:
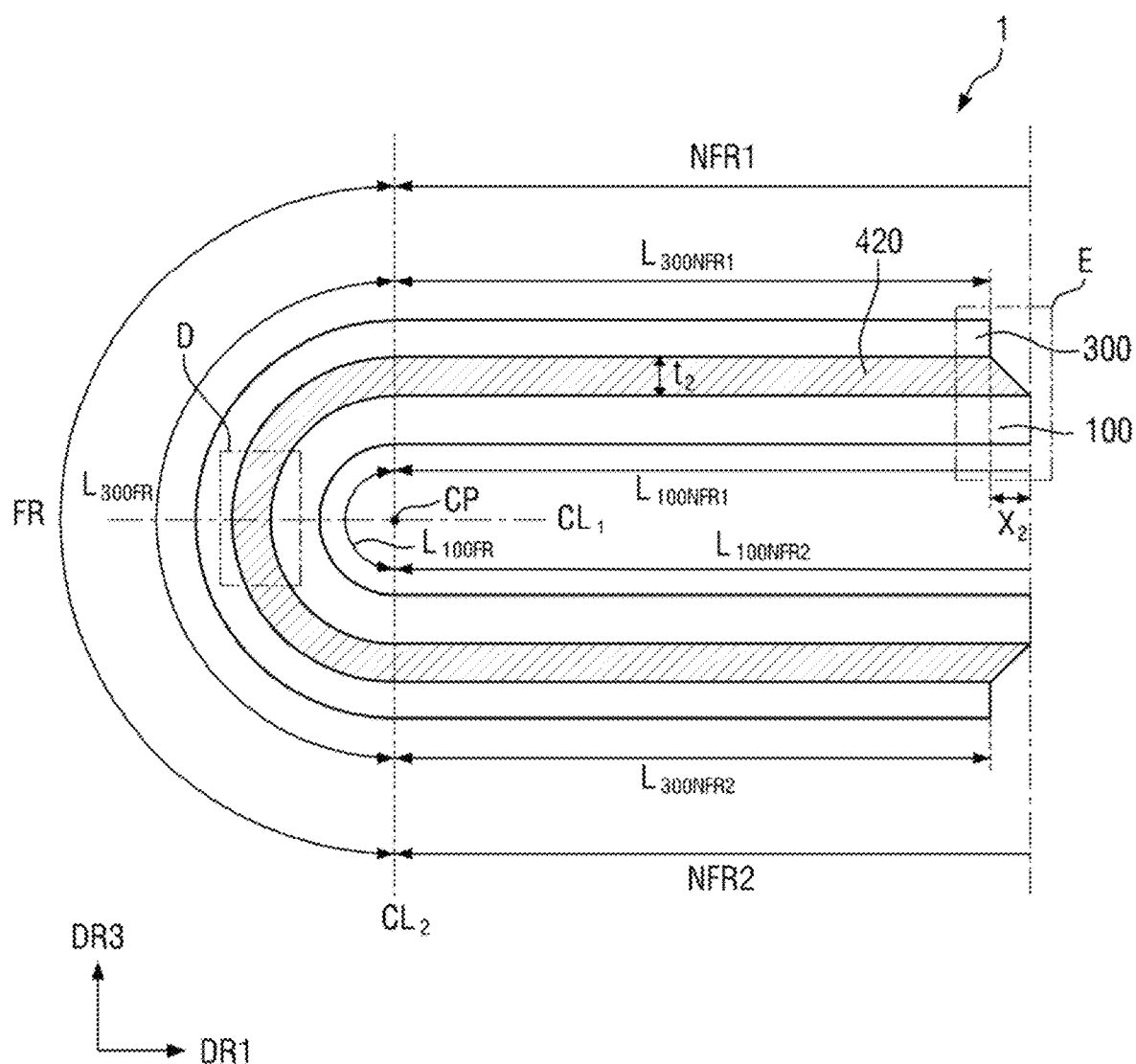
FIG. 8 is an enlarged cross-sectional view illustrating a display panel, a second adhesive layer, and a second member of FIG. 6.
Figure 9:
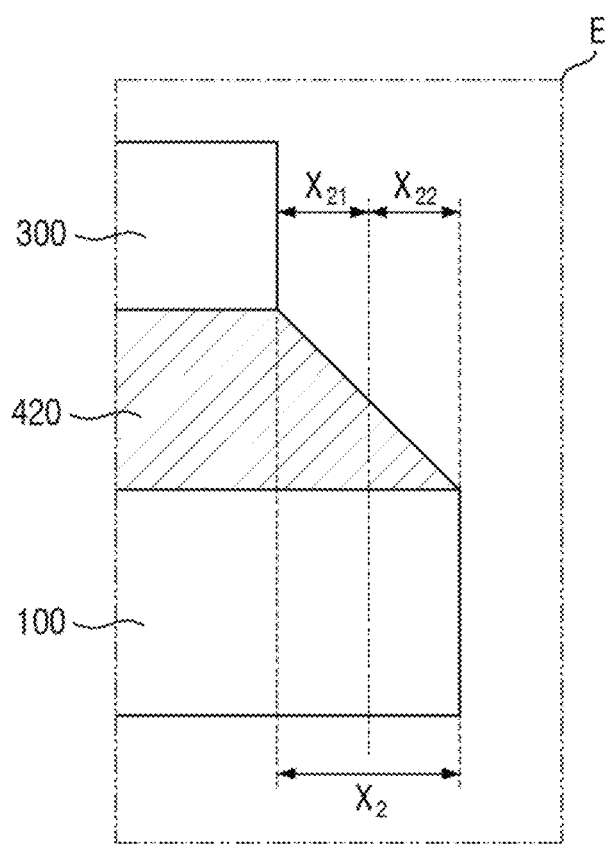
FIG. 9 is an enlarged cross-sectional view illustrating an area E of FIG. 8.
Figure 10:
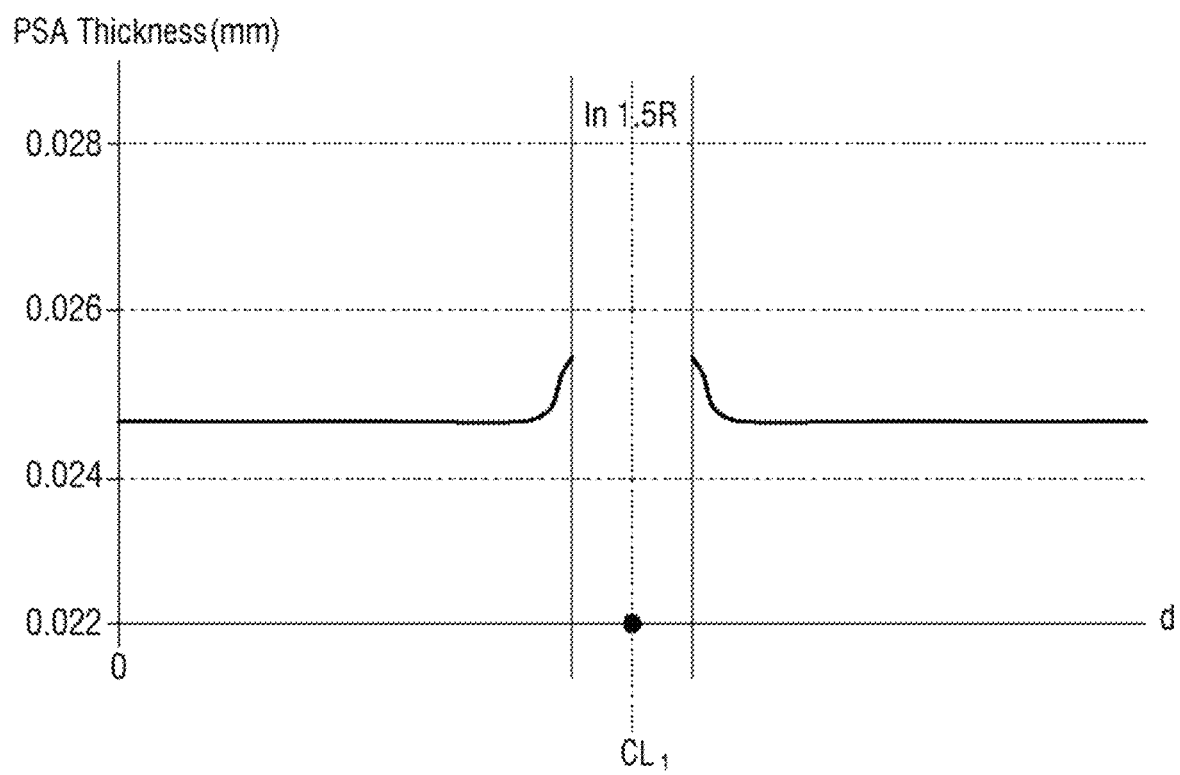
FIG. 10 is a graph showing a variation of the thickness of the second adhesive layer in the display device of FIG. 1 in its folded state.
Figure 11:
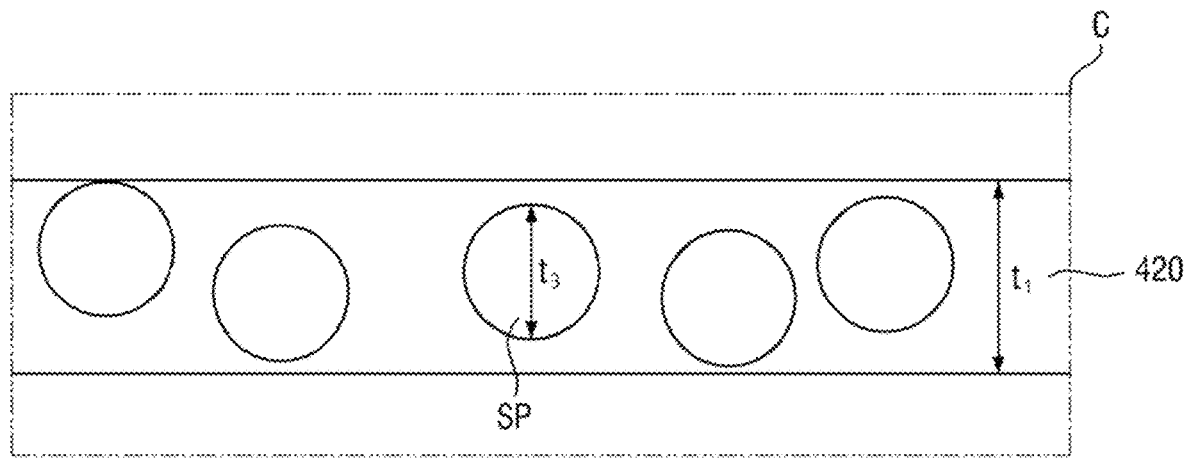
FIG. 11 is an enlarged cross-sectional view illustrating part C of FIG. 7.
Figure 12:
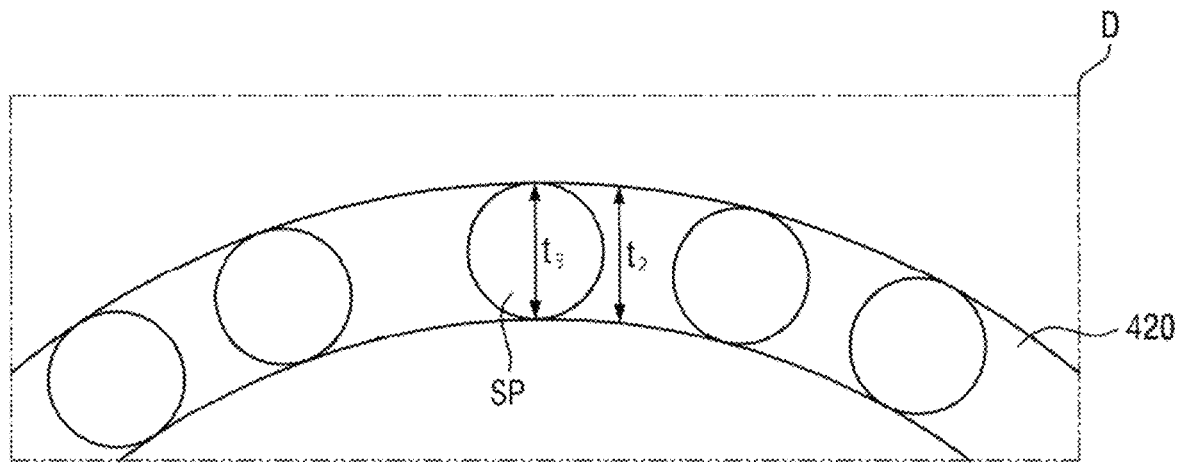
FIG. 12 is an enlarged cross-sectional view illustrating part D of FIG. 8.
Figure 13:
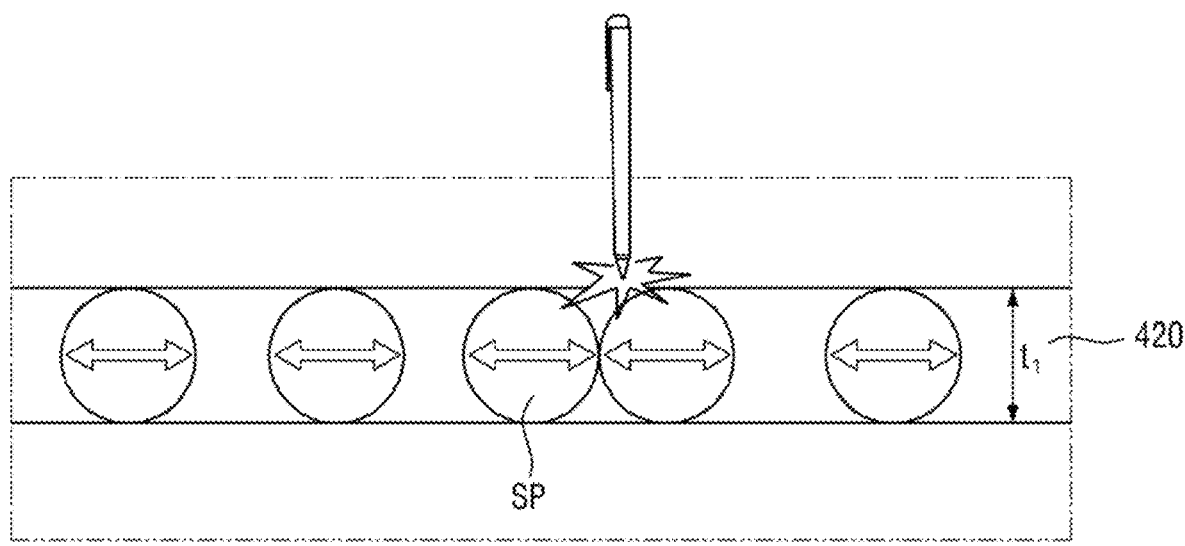
FIG. 13 is a cross-sectional view illustrating a shock resistance in the second adhesive layer of the display device of FIG. 1.

FIG. 3 is a cross-sectional view taken along line I-I' of FIG. 1. FIG. 4 is an enlarged cross-sectional view illustrating an area A of FIG. 3. FIG. 5 is an enlarged cross-sectional view illustrating an area B of FIG. 3. FIG. 6 is a cross-sectional view of the display device of FIG. 1 in its folded state. FIG. 7 is an enlarged cross-sectional view illustrating a display panel, a second adhesive layer, and a second member of FIG. 3. FIG. 8 is an enlarged cross-sectional view illustrating a display panel, a second adhesive layer, and a second member of FIG. 6. FIG. 9 is an enlarged cross-sectional view illustrating an area E of FIG. 8. FIG. 10 is a graph showing a variation of the thickness of the second adhesive layer in the display device of FIG. 1 in its folded state. FIG. 11 is an enlarged cross-sectional view illustrating pan C of FIG. 7. FIG. 12 is art enlarged cross-sectional view illustrating part D of FIG. 8. FIG. 13 is a cross-sectional view illustrating a shock resistance in the second adhesive layer of the display device of FIG. 1. Referring to FIG. 10, a horizontal axis represents the length direction of the display device 1 that extends from one short edge (e.g., the first short edge SS1 of FIG. 1) to another short edge (e.g., the second short edge SS2 of FIG. 1) of the display device 1, and a vertical axis represents the thickness of an adhesive layer of the display device 1.

Referring to FIGS. 3 through 13, the display device 1 may include a display panel 100, a first member 200, a second member 300 a first adhesive layer 410, and a second adhesive layer 420, which is disposed between the display panel 100 and the second member 300. The first member 200 is disposed on the display panel 100. The second member 300 is disposed below the display panel 100. The first adhesive layer 410 is disposed between the display panel 100 and the first member 200. The first adhesive layer 410 may couple the display panel 100 and the first member 200 to each other, and the second adhesive layer 420 may couple the display panel 100 and the second member 300 to each other. For example, the first and second adhesive layers 410 and 420 may each include a pressure sensitive adhesive (PSA).

In a case where the display device 1 is a top-emission display device, the first adhesive layer 410, which is disposed on the display panel 100, may have a relatively high light transmittance. Accordingly, the light transmittance of the first adhesive layer 410 may be higher than the light transmittance of the second adhesive layer 420, but the present invention is not hunted thereto. In addition, according to an embodiment of the present invention, the light transmittance of the first adhesive layer 410 may be the same as the light transmittance of the second adhesive layer 420. For example, the first adhesive layer 410 may include an OCR or an optically transparent adhesive (OCA).

The first member 200 may include an upper functional member 210, a window 220, and a protective film 230, which is disposed on the window 220. The upper functional member 210 is disposed on the display panel 100. The window 220 is disposed on the upper functional member 210. The first member 200 may further include a third adhesive layer 441, which is disposed between the upper functional member 210 and the window 220 to couple the upper functional member 210 and the window 220 to each other, and a fourth adhesive layer 412, which is disposed between the window 220 and the protective film 230 to couple the window 220 and the protective film 230 to each other. The third and fourth adhesive layers 411 and 412 may each include a PSA. In a case where the display device 1 is a top-emission display device, the light transmittance of the third and fourth adhesive layers 411 and 412 may be higher than the light transmittance of the second adhesive layer 420 and a fifth adhesive layer 421, but the present invention is not limited thereto. For example, the third and fourth adhesive layers 411 and 412 may each include an OCR or an OCA.

The second member 300 may include a pattern film 510, which is disposed below the display panel 100, and a cushion layer 520, which is disposed below the pattern film 510. The second member 300 may further include the fifth adhesive layer 421, which is disposed between the pattern film 510 and the cushion layer 520 to couple the pattern film 510 and the cushion layer 520 to each other. The fifth adhesive layer 421 may include a PSA. The following description of the second adhesive layer 420 may also be applicable to the fifth adhesive layer 421 without departing from the spirit and scope of the present invention.

The display panel 100 may be disposed in and across the folding area FR and the first and second non-folding areas NFR1 and NFR2. An organic light-emitting diode (OLED) display panel, a liquid crystal display (LCD) panel, a plasma display panel (PDP), electrophoretic display (EPD) panel, an electrowetting display panel, a quantum-dot light-emitting diode (QLED) display panel, a micro-light-emitting diode (micro-LED) display panel, a nano-light-emitting diode (nano-LED) display panel, or the like may be used as the display panel 100. The display panel 100 will hereinafter be described as being, for example, an OLED display panel.

The display panel 100 may include a flexible substrate that includes, for example, a flexible polymer material such as polyimide (PI). Accordingly, the display panel 100 can be curved, bent, folded, or roiled. The display panel 100 may have a similar shape to the display device 1 in a plan view. A plurality of pixels may be disposed in an area of the display panel 100 that overlaps with the display area DA, and signal lines for applying signals to the pixels and/or driving circuits may be disposed in an area of the display panel 100 that overlaps with the non-display area NDA.

The pixels may include a light-emitting layer and a circuit layer, which controls the amount of light emitted by the light-emitting layer. The circuit layer may include a plurality of lines, a plurality of electrodes, and at least one transistor. In an embodiment of the present invention, the light-emitting layer may include an organic light-emitting material. The light-emitting layer may be sealed by an encapsulation film. The encapsulation film may prevent the penetration of moisture from the outside by sealing the light-emitting layer. The encapsulation film may be formed as a single- or multilayer inorganic film in which inorganic films and organic films are alternately stacked.

The first member 200 may be disposed on the display panel 100. As already mentioned above, the first member 200 may include the upper functional member 210, which is disposed on the display panel 100, the window 220, which is disposed on the upper functional member 210, and the protective film 230, which is disposed on the window 220. The upper functional member 210 may include a touch member or an optical member such as a polarizing film.

The window 220 covers and may protect the underlying members, e.g., the display panel 100, the upper functional member 210, and the second member 300. The window 220 may be formed of, for example, glass, quartz, or the like. The thickness of the window 220 may be less than about 100 µm. In an embodiment of the present invention, the window 220 may include ultra-thin glass (UTG).

The protective film 230, which is disposed on the window 220, may cover and protect the underlying members including the window 220 and the upper functional member 210.

The second member 300 may be disposed below the display panel 100. As already mentioned above, the second member 300 may include the pattern film 510, which is disposed below the display panel 100, and the cushion layer 520, which is disposed below the pattern film 510. The pattern film 510 may include, for example, polyimide (PI) or polyethylene terephthalate (PET). The cushion layer 520 may include, for example, a foam-type buffer material.

As illustrated in FIG. 3, light generated by the display panel 100 may be emitted upwardly through the first adhesive layer 410 and the first member 200.

The folding area FR and the first and second non-folding areas NFR1 and NFR2 may be by the curvature radiuses of the elements (e.g., the display panel 100, the first member 200, and the second member 300) of the display device 1, when folded. As illustrated in FIG. 6, the display panel 100, the first member 200, and the second member 300 may be bent to have different curvature radiuses from each other, e.g., first, second, and third curvature radiuses R1, R2, and R3, respectively. For example, the first, second, and third curvature radiuses R1, R2, and R3 may be substantially uniform. For example, the display panel 100, the first member 200, and the second member 300 may each form an arc to respectively form the first, second, and third curvature radiuses R1, R2, and R3 from a central point CP. The display panel 100, the first member 200, and the second member 300, which have different curvature radiuses from the central point CP from each other, may form the folding area FR.

The curvature radius of the display device 1 may increase from the first curvature radius R1 to the second curvature radius R2 and to the third curvature radius R3. In other words, the first curvature radius R1 may be the smallest, the second curvature radius R2 may be between the first and third curvature radiuses R1 and R3, and the third curvature radius R3 may be the greatest.

In the folding area FR of the first member 200, a surface of the first member 200 that is adjacent to the central point CP may have a semicircular shape with a substantially uniform first curvature radius R1 from the central point CP. In this case, the length of the folding area FR of the first member 200 may be $\pi*R1$. In the folding area FR of the display panel 100, a surface of the display panel 100 that is adjacent to the central point CP may have a semicircular shape with a substantially uniform second curvature radius R2 from the central point CP. In this case, the length of the folding area FR of the display panel 100 may be $\pi*R2$. In the folding area FR of the second member 300, a surface of the second member 300 that is adjacent to the central point CP may have a semicircular shape with a substantially uniform third curvature radius R3 from the central point CP. In this case, the length of the folding area FR of the second member 300 may be $\pi*R3$. Since the curvature radius of the display device 1 increases from the first curvature radius R1 to the second curvature radius R2 and to the third curvature radius R3, the length of the folding area FR of the display device 1 may increase from the first member 200 to the display panel 100, and from the display panel 100 to the second member 300.

FIG. 6 illustrates that when the display device 1 is folded, the boundaries between the folding area FR and the first and second non-folding areas NFR1 and NFR2 in each of the display panel 100, the first member 200, and the second member 300 are aligned in the thickness direction of the display device 1 (or the third direction DR3). For example, when the display device 1 is folded, the boundary between the folding area FR and the first non-folding area NFR1, in each of the display panel 100, the first member 200 and the second member 300, is aligned with the boundary between the folding area FR and the second non-folding area NFR2, in each of the display panel 100, the first member 200 and the second member 300, in the third direction DR3.

In an embodiment of the present invention, the lengths of the folding areas FR of the display panel 100, the first member 200, and the second member 300 may have a predetermined error value reflected therein. For example, the length of the folding area FR of the window 220 may be $\pi*R1\pm(4\ mm\sim 5\ mm)$, the length of the folding area FR of the display panel 100 may be $\pi*R2\pm(4\ mm\sim 5\ mm)$, and the length of the folding area FR of a supporting film 310 may be $\pi*R3\pm(4\ mm\sim 5\ mm)$.

As illustrated in FIG. 3, when the display device 1 is unfolded, sides of each of the display panel 100, the first member 200, and the second member 300 may be aligned in the thickness direction of the display device 1 (or the third direction DR3). For example, the display panel 100, the first member 200, and the second member 300 may have the same length so that their sides may be aligned in the thickness direction of the display device 1 when the display device 1 is unfolded. However, since the length of the folding area FR of the display device 1 increases from the first member 200 to the display panel 100 and from the display panel 100 to the second member 300, the length of the first and second non-folding areas NFR1 and NFR2 may decrease from the first member 200 to the display panel 100 and from the display panel 100 to the second member 300.

The display panel 100, the first member 200, and the second member 300 may maintain the same length, e.g., a length $L_1$, whether the display device 1 is folded or unfolded.

Thus, when the display device 1 is folded, the boundaries between the folding area FR and the first and second non-folding areas NFR1 and NFR2 of each of the display panel 100, the first member 200, and the second member 300 may be aligned in the thickness direction of the display device 1 (or the third direction DR3), but ends of the first and second non-folding areas NFR1 and NFR2 of the display device 1 may be recessed stepwise, in the opposite direction of the first direction DR1, from the first member 200 to the display panel 100 and from the display panel 100 to the second member 300. For example, an end of the display panel 100, which is disposed on the first member 200, is recessed with respect to an end of the first member 200, and an end of the second member 300, which is disposed on the display panel 100, is recessed more than the end of the display panel 100.

The length by which the ends of the first and second non-folding areas NFR1 and NFR2 of the display panel 100 are recessed from the ends of the first and second non-folding areas NFR1 and NFR2 of the first member 200 may be defined as a first recess length $X_1$, and the length by which the ends of the first and second non-folding areas NFR1 and NFR2 of the second member 300 are recessed from the ends of the first and second non-folding areas NFR1 and NFR2 of the display panel 100 may be defined as a second recess length $X_2$.

To achieve the first recess length $X_1$, the length of the first member 200 may be changed by as much as some or all of the first recess length X1 by a force toward the ends of the first and second non-folding areas NFR1 and NFR2, and the length of the display panel 100 may be changed by as much as some or all of the first recess length X1 by a force toward the center of the folding area FR.

Similarly, to achieve the second recess length X2, the length of the display panel 100 may be changed by as much as some or all of the second recess length $X_2$ by a force toward the ends of the first and second non-folding areas NFR1 and NFR2, and the length of the second member 300 may be changed by as much as some or all of the second recess length $X_2$ by a force toward the center of the folding area FR.

Forces applied to the display panel 100 and the second member 300 in opposite directions, with respect to each other, and forces applied to the display panel 100 and the first member 200 in opposite directions, with respect to each other, may cause torsional stress to the first and second adhesive layers 410 and 420. The torsional stress may be alleviated as parts of the first and second adhesive layers 410 and 420 adjacent to the display panel 100, the first member 200, and the second member 300 move in response to the relative movement of the display panel 100, the first member 200, and the second member 300 with respect to one another.

Referring to FIG. 8, a line that passes through the central point CP to divide the folding area FR in halves may be a first reference line $CL_1$. A line that passes through the central point CP, the boundary between the folding area FR and the first non-folding area NFR1 and the boundary between the folding area FR and the second non-folding area NFR2 may be a second reference line CL2.

As illustrated in FIGS. 7 and 8, the display panel 100 may have a first panel length $L_{100FR}$ and second panel lengths $L_{100NFR1}$ and $L_{100NFR2}$. The first panel length $L_{100FR}$ is in folding area FR, and second panel lengths $L_{100NFR1}$ and $L_{100NFR2}$ are in the first and second non-folding areas NFR1 and NFR2, respectively. The second member 300 may have a (1-1)-th member length $L_{300FR}$ and a (1-2)-th member lengths $L_{300NFR1}$ and $L_{300NFR2}$. The (1-1)-th member length $L_{300FR}$ is in the folding area FR, and the (1-2)-th member lengths $L_{300NFR1}$ and $L_{300NFR2}$ are in the first and second non-folding areas NFR1 and NFR2, respectively. The first panel length $L_{100FR}$ may be smaller than the (1-1)-th member length $L_{300FR}$, and the second panel lengths $L_{100NFR1}$ and $L_{100NFR2}$ may be greater than the (1-2)-th member lengths $L_{300NFR1}$ and $L_{300NFR2}$, respectively.

As illustrated in FIG. 9, to achieve the second recess length $X_2$, the length of the display panel 100 may be changed by as much as some of the second recess length $X_2$, e.g., a length $X_{22}$, by a force toward the ends of the first and second non-folding areas NFR1 and NFR2, and the length of the second member 300 may be changed by as much as some of the second recess length $X_2$, e.g., a length $X_{21}$, by a force toward the center of the folding area FR. Accordingly, the ends of the second member 300 may be recessed from the ends of the display panel 100 by as much as the second recess length $X_2$.

Referring to FIG. 7, the second adhesive layer 420 may have a first thickness $t_1$. When the display device 1 is unfolded, the second adhesive layer 420 may have a substantially uniform thickness, e.g., the first thickness $t_1$. The first thickness $t_1$ of the second adhesive layer 420 may be about 10 μm to about 100 μm.

As illustrated in FIGS. 11 through 13, the second adhesive layer 420 may include spacers SP, which are distributed in the second adhesive layer 420. The spacers SP may increase the shock resistance of the display device 1. In addition, the first adhesive layer 410 may not include the spacers SP. Accordingly, the light transmittance of the first adhesive layer 410 can be prevented from decreasing due to the presence of the spacers SP.

In an embodiment of the present invention, the spacers SP may be disposed in the third adhesive layer 411 and/or the fourth adhesive layer 412.

In an embodiment of the present invention, the spacers SP may have a circular shape in a plan view and may actually have a spherical shape. A diameter $t_3$ is of each of the spacers SP may be smaller than the thickness of the second adhesive layer 420 when the display device 1 is unfolded, e.g., the first thickness $t_1$.

However, the present invention is not limited to thereto. For example, the spacers SP may have a rectangular shape, a square shape, or a non-tetragonal polygonal shape, or an elliptical shape in a plan view. In an embodiment of the present invention where the spacers SP have a non-circular shape in a plan view, the part of each of the spacers SP that has a greatest width may correspond to the diameter $t_3$ of the spacers SP.

In an embodiment of the present invention, the spacers SP may have a rod shape or a cylindrical shape.

For example, the spacers SP may include spherical plastic beads, spherical silica, rod-shaped glass fiber, or a plastic-based material, and the plastic-based material may include, for example, the polymer or crosslinked product of a divinylbenzene monomer, a benzoguanamine monomer, and a styrene monomer.

The thickness (e.g., the second thickness t2) of the second adhesive layer 420 when the display device 1 is in-folded may differ from the thickness (e.g., the first thickness t1) of the second adhesive layer 420 when the display device 1 is unfolded.

Referring to FIG. 10 as "In1.5R" section, which corresponds to the folding area FR of the display device 1, is located in the middle of a length d from the first short edge SS1 to the second short edge SS2 of the display device 1. A section from a length d of 0 to the "In1.5R" section may correspond to the first non-folding area NFR1 of the display device 1, and a section beyond the "In1.5R" section may correspond to the second non-folding area NFR2 of the display device 1.

The first reference line $CL_1$ may be located in the "In1.5R" section.

The thickness of the second adhesive layer 420 when the display device 1 is folded. i.e., the second thickness $t_2$, may be smaller at a vertex of the curvature of the folding area FR that meets the first reference line $CL_1$ than in the first and second non-folding areas NFR1 and NFR2.

The second thickness $t_1$ may be about 25 μm in the first and second non-folding areas NFR1 and NFR2 and about 22 μm at the vertex of the curvature of the folding area FR that meets the first reference line $CL_1$. For example, the second thickness $t_2$ at the vertex of the curvature of the folding area FR that meets the first reference line $CL_1$ may be about 88% of the second thickness $t_2$ in the first and second non-folding areas NFR1 and NFR2.

The diameter $t_3$ of each of the spacers SP is associated with the thickness of the second adhesive layer 420 when the display device 1 is folded, i.e., the second thickness $t_2$. The diameter $t_3$ of the spacers SP may be smaller than the second thickness $t_2$ in the first and second non-folding areas NFR1 and NFR2 and may be the same as, or smaller than, the second thickness $t_2$ at the vertex of the curvature of the folding area FR that meets the first reference line $CL_1$. For example, the diameter $t_3$ of each of the spacers SP may be about 60% to about 88% of the second thickness $t_2$ in the first and second non-folding areas NFR1 and NFR2.

In a case where the diameter $t_3$ of the spacers SP is the same as the second thickness $t_2$ at the vertex of the curvature of the folding area FR that meets the first reference line $CL_1$, the spacers SP may be in contact with both surfaces of the second adhesive layer 420 when the display device 1 is folded.

FIG. 11 illustrates how the spacers SP are distributed in the second adhesive layer 420 when the display device 1 is in its unfolded state. FIG. 12 illustrates how the spacers SP are distributed in the second adhesive layer 420 when the display device 1 is in its folded state, and FIG. 13 illustrates how the spacers SP are distributed in the second adhesive layer 420 when the display device 1 is switched back to its unfolded state from its folded state of FIG. 12.

If the diameter $t_3$ of each of the spacers SP is about 60% or greater of the second thickness $t_2$ in the first and second non-folding areas NFR1 and NFR2, the spacers SP may be disposed in the second adhesive layer 420 to be aligned with each other, when the display device 1 is in its folded state, as illustrated in FIG. 12, and is switched from its folded state to its unfolded state, as illustrated in FIG. 13. When the display device 1 is switched from its folded state to its unfolded state, the spacers SP may tend to scatter randomly out of their state of alignment. However, since the diameter $t_3$ of the spacers SP is about 60% or greater of the second thickness $t_2$ in the first and second non-folding areas NFR1 and NFR2, the spacers SP can be prevented from scattering randomly when the display device 1 is switched from its folded state to its unfolded state. As illustrated in FIGS. 12 and 13, a plurality of spacers SP may be provided and may be in contact with one another. For example, the display device 1 can provide uniformly increased shock resistance due to the second adhesive layer 420, as illustrated in FIG. 13, regardless of whether the display device 1 is in its folded state or is switched from its folded state to its unfolded state.

In addition, since the diameter $t_3$ of the spacers SP is about 88% or less of the second thickness $t_2$ in the first and second non-folding areas NFR1 and NFR2, the spacers SP may not interfere with the movement of parts of the second adhesive layer 420, adjacent to the display panel 100 and the second member 300 in response to the relative movement of the display panel 100, the first member 200, and the second member 300. In addition, the stress of the display device 1 can be relieved.

Display devices according to an embodiment of the present invention will hereinafter be described, focusing mainly on the differences with the display device according to the aforementioned embodiment.

Figure 14:
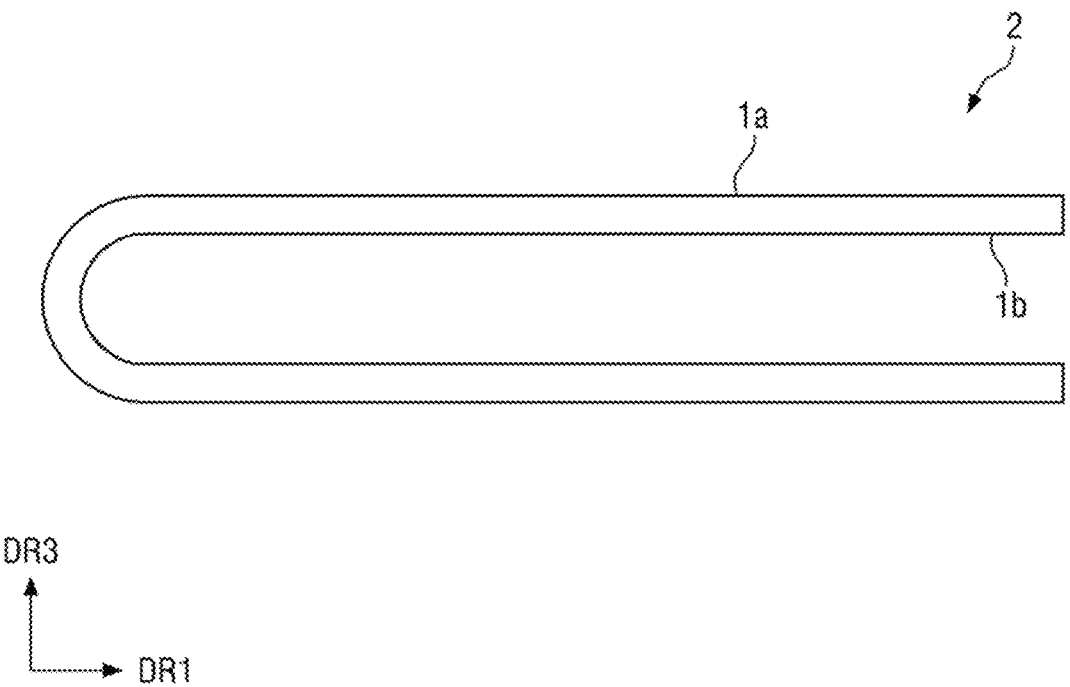
FIG. 14 is a cross-sectional view of a display device in its folded state according to an embodiment of the present invention.
Figure 15:
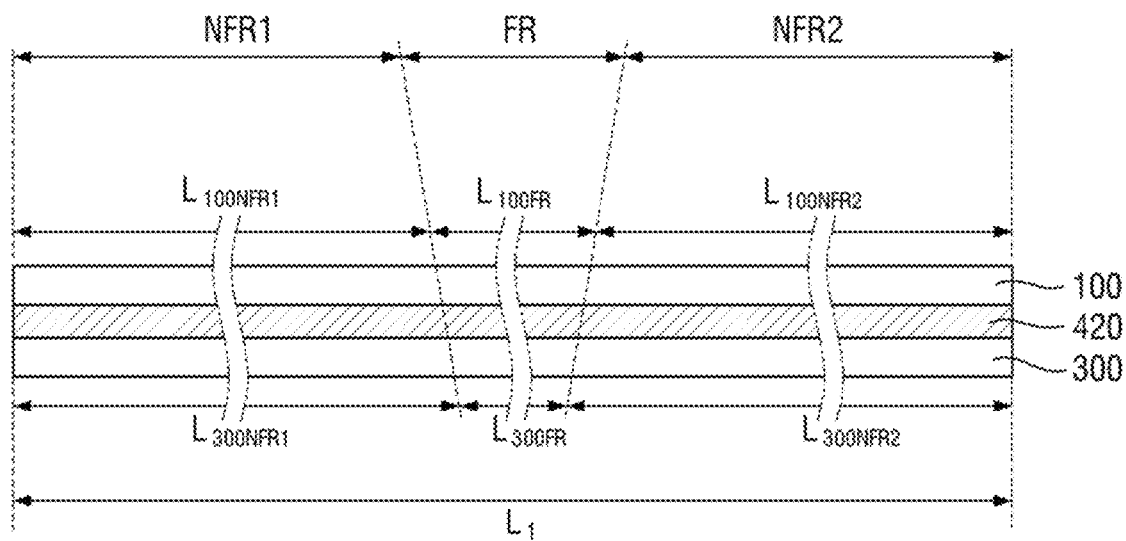
FIG. 15 is a partial cross-sectional view of the display device of FIG. 14.
Figure 16:
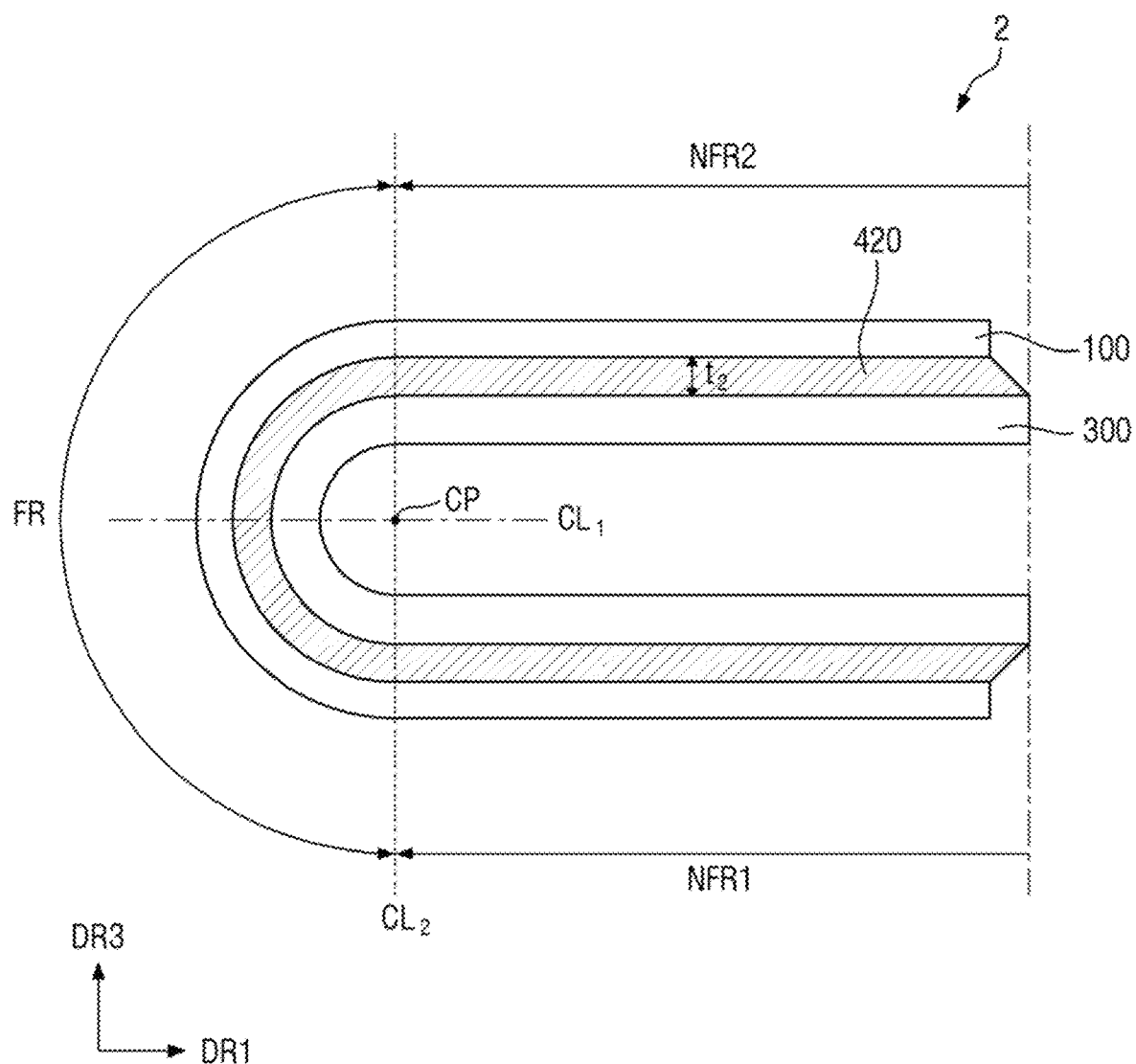
FIG. 16 is a partial cross-sectional view of the display device of FIG. 14 in its folded state.
Figure 17:
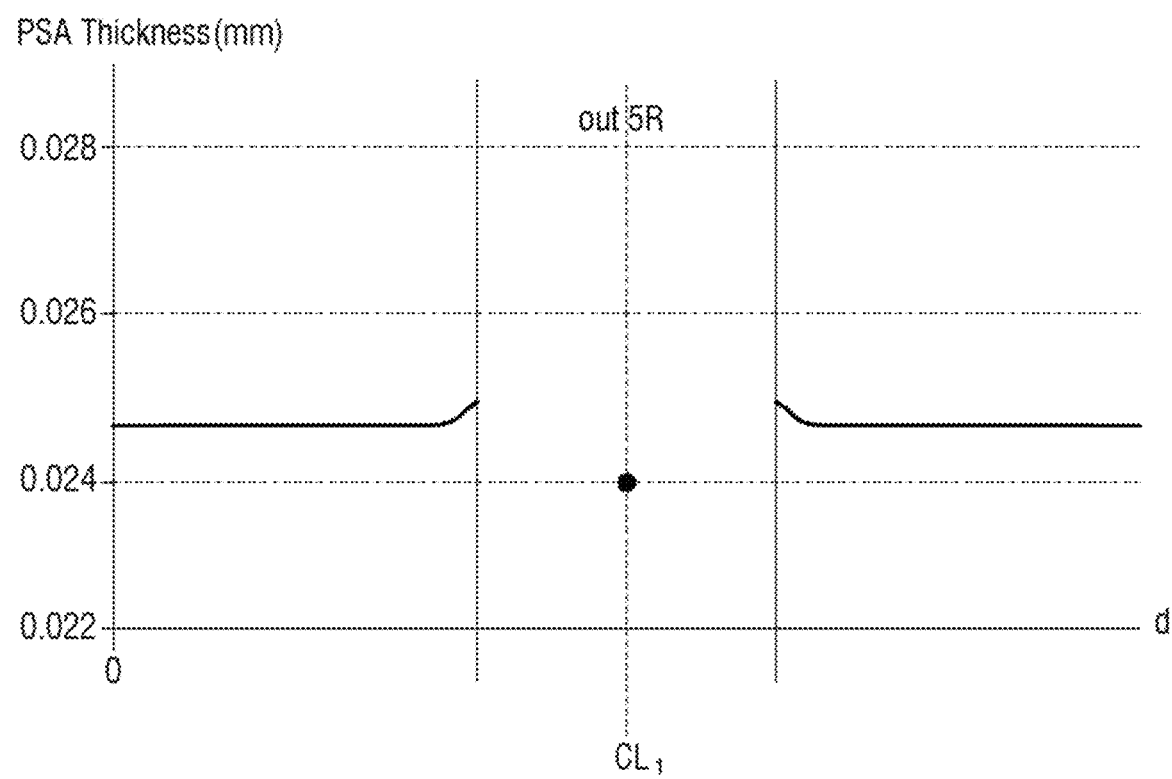
FIG. 17 is a graph showing a variation of the thickness of a second adhesive layer in the display device of FIG. 14 in its folded state.

FIG. 14 is a cross-sectional view of a display device in its folded state according to an embodiment of the present invention. FIG. 15 is a partial cross-sectional view of the display device of FIG. 14. FIG. 16 is a partial cross-sectional view of the display device of FIG. 14 in its folded state, and FIG. 17 is a graph showing a variation of the thickness of a second adhesive layer in the display device of FIG. 14 in its folded state.

Referring to FIGS. 14 through 17, a display device 2 differs from the display device 1 in that it is out-folded so that parts of a second surface 1b of the display device 1 face each other.

For example, a display panel 100 may have a first panel length $L_{100FR}$ and second panel lengths $L_{100NFR1}$ and $L_{100NFR2}$. The first panel length $L_{100FR}$ is in the folding area FR, and the second panel lengths $L_{100NFR1}$ and $L_{100NFR2}$ are in first and second non-folding areas NFR1 and NFR2, respectively. A second member 300 may have a (1-1)-th member length $L_{300FR}$ and (1-2)-th member lengths $L_{300NFR1}$ and $L_{300NFR2}$. The (1-1)-th member length $L_{300FR}$ is in the folding area. FR, and the (1-2)-th member lengths $L_{300NFR1}$ and $L_{300NFR2}$ are in the first and second non-folding areas NFR1 and NFR2, respectively. The first panel length $L_{100FR}$ may be greater than the (1-1)-th member length $L_{300FR}$, and the second panel lengths $L_{100NFR1}$ and $L_{100NFR2}$ may be smaller than the (1-2)-th member lengths $L_{300NFR1}$ and $L_{300NFR2}$, respectively.

As illustrated in FIG. 16, parts, in the first and second non-folding areas NFR1 and NFR2, of a surface of a second member 300 that is opposite to a surface of the second member 300 that faces the display panel 100 may face each other.

Referring to FIG. 17, an "Out5R" section, which corresponds to the folding area FR of the display device 2, is located in the middle of a length d from a first short edge SS1 to a second short edge SS2 of the display device 2. A section from a length d of 0 to the "Out5R" section may correspond to the first non-folding area NFR1 of the display device 2, and a section beyond the "Out5R" section may correspond to the second non-folding area NFR2 of the display device 2.

A first reference line $CL_1$ may be located in the "Out5R" section.

The thickness of a second adhesive layer 420 when the display device 2 is folded, i.e., a second thickness $t_2$, may be smaller at a vertex of the curvature of the folding area FR that meets the first reference line $CL_1$ than in the first and second non-folding areas NFR1 and NFR2.

The second thickness $t_2$ may be about 25 μm in the first and second non-folding areas NFR1 and NFR2 and about 24 μm at the vertex of the curvature of the folding area FR that meets the first reference line $CL_1$. For example, the second thickness $t_2$ at the vertex of the curvature of the folding area FR that meets the first reference line $CL_1$ may be about 96% of the second thickness $t_2$ in the first and second non-folding areas NFR1 and NFR2.

A diameter $t_3$ of each of the spacers SP is associated with the thickness of the second adhesive layer 420 when the display device 1 is folded, i.e., the second thickness $t_2$. The diameter $t_3$ of each of the spacers SP may be smaller than the second thickness $t_2$ in the first and second non-folding areas NFR1 and NFR2, and may be the same as, or smaller than, the second thickness $t_2$ at the vertex of the curvature of the folding area FR that meets the first reference line $CL_1$. For example, the diameter $t_3$ of each of the spacers SP may be about 60% to about 96% of the second thickness $t_2$ in the first and second non-folding areas NFR1 and NFR2.

Figure 18:
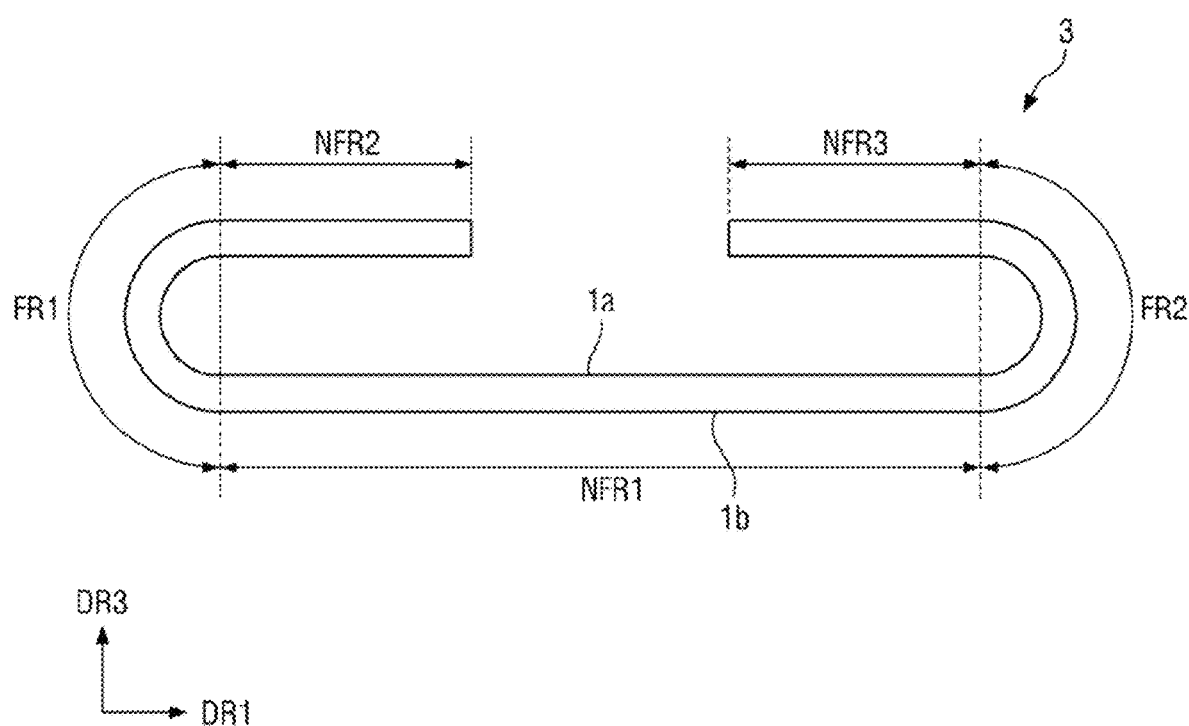
FIG. 18 is a cross-sectional view of a display device in its folded state according to an embodiment of the present invention.
Figure 19:
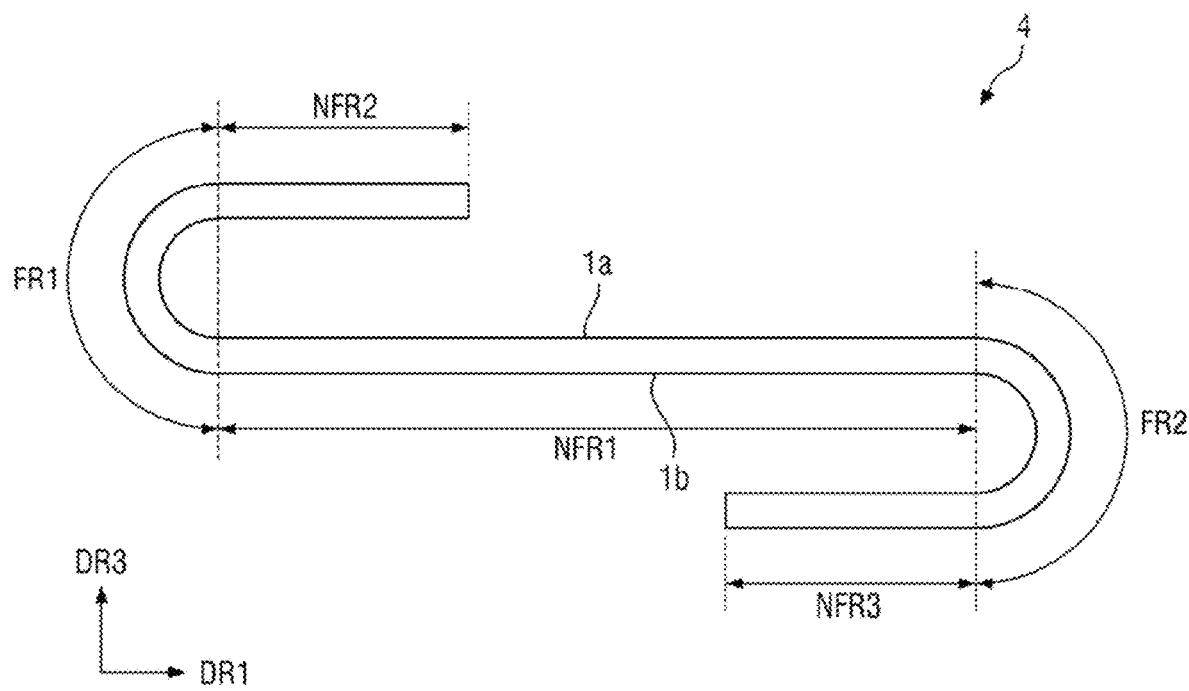
FIG. 19 is a cross-sectional view of a display device in its folded state according to an embodiment of the present invention.

FIG. 18 is a cross-sectional view of a display device in its folded state according to an embodiment of the present invention. FIG. 19 is a cross-sectional view of a display device in its folded state according to an embodiment of the present invention FIGS. 18 and 19 show that the folding direction of the display device 1 of FIG. 1 or the display device 2 may vary.

Referring to FIGS. 18 and 19, in each of display devices 3 and 4, a first folding area FR1, a second folding area FR2, a first non-folding area NFR1, a second non-folding area NFR2, and a third non-folding area NFR3 may be provided. The first non-folding area NFR1 is disposed between the first and second folding areas FR1 and FR2. The second non-folding area NFR2 is spaced apart from the first non-folding area NFR1 by the first folding area FR1. The third non-folding area NFR3 is spaced apart from the first non-folding area NFR1 by the second folding area FR2.

The embodiment of FIG. 18 differs from the embodiment of FIGS. 1 and 2 in that first surfaces 1a of the first and second non-folding areas NFR1 and NFR2 face each other, and that the first surface 1a of the first non-folding area NFR1 and a first surface 1a of the third non-folding area NFR3 face each other.

The embodiment of FIG. 19 differs from the embodiment of FIGS. 1 and 2 in that first surfaces 1a of the first and second non-folding, areas NFR1 and NFR2 face each other, and that second surfaces 1b of the first and third non-folding areas NFR1 and NFR3 face each other. The display devices 3 and 4 are almost the same as the display device 1, and thus, detailed descriptions thereof will be omitted.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a folding area;
a first non-folding area disposed on a first side of the folding area;
a second non-folding area disposed on a second side of the folding area;
a display panel;
a first member disposed on the display panel;
a second member disposed on the display panel;
a first adhesive layer disposed between the display panel and the first member; and
a second adhesive layer disposed between the display panel and the second member,
wherein spacers are disposed in the second adhesive layer,
wherein the second member includes a film layer and a cushion layer that are disposed on the display panel,
wherein the spacers are disposed in the folding area.

2. The display device of claim 1, wherein the first and second adhesive layers each include a pressure sensitive adhesive.

3. The display device of claim 2, wherein the second adhesive layer has a lower light transmittance than that of the first adhesive layer.

4. The display device of claim 2, further comprising:
a first surface; and
a second surface that is opposite to the first surface of the display device,
wherein the first member has a first surface that faces the first adhesive layer and a second surface that is opposite to the first surface of the first member,
the second member has a first surface that faces the second adhesive layer and a second surface that is opposite to the first surface of the second member, and
the first and second surfaces of the display device are respectively the second surfaces of the first and second members.

5. The display device of claim 4, wherein the display device is configured to fold, and when the display device is in a folded state, the first surfaces of the first and second non-folding areas face each other.

6. The display device of claim 5, wherein when the display device is in the folded state, a side of the display panel is disposed on the inside of a side of the first member, in the first non-folding area.

7. The display device of claim 6, wherein when the display device is in the folded state, a thickness of the second adhesive layer is greater in the first non-folding area than in the folding area.

8. The display device of claim 7, wherein
the spacers have a spherical shape, and
when the display device is in the folded state, a diameter of each of the spacers is about 60% to about 88% of the thickness of the second adhesive layer in the first non-folding area.

9. The display device of claim 8, wherein
the second adhesive layer has a first surface that faces the display panel and a second surface that is opposite to the first surface of the second adhesive layer, and
when the display device is in the folded state, the spacers are in contact with the first and second surfaces of the second adhesive layer, in the folding area.

10. The display device of claim 7, wherein the first member includes an upper functional member, a third adhesive layer, and a window, wherein the upper functional member is disposed on the display panel, wherein the third adhesive layer is disposed on the upper functional member, and wherein the window is disposed on the third adhesive layer.

11. The display device of claim 10, wherein the second member further includes a fourth adhesive layer, wherein the film layer is disposed on the display panel, wherein the fourth adhesive layer is disposed on the film layer, and wherein the cushion layer is disposed on the fourth adhesive layer.

12. The display device of claim 11, wherein the spacers are further disposed in the fourth adhesive layer.

13. The display device of claim 4, wherein the display device is configured to fold, and when the display device is in a folded state, the second surfaces of the first and second non-folding areas face each other.

14. The display device of claim 2, wherein
the spacers include spherical plastic beads, spherical silica, rod-shaped glass fiber, and/or a plastic-based material, and
the plastic-based material includes a polymer or cross-linked product of a divinylbenzene monomer, a benzoguanamine monomer, and a styrene monomer.

15. A display device comprising:
a display panel;
a first member disposed on the display panel;
a second member disposed on the display panel;

a first adhesive layer disposed between the display panel and the first member; and a second adhesive layer disposed between the display panel and the second member, wherein spacers are disposed in the second adhesive layer, wherein the first and second adhesive layers each include a pressure sensitive adhesive, wherein the display device further comprises:

a first folding area;

a second folding area;

a first non-folding area disposed between the first and second folding areas;

a second non-folding area spaced apart from the first non-folding area by the first folding area;

a third non-folding area spaced apart from the first non-folding area by the second folding area;

a first surface; and a second surface that is opposite to the first surface of the display device, wherein the first member has a first surface that faces the first adhesive layer and a second surface that is opposite to the first surface of the first member, the second member has a first surface that faces the second adhesive layer and a second surface that is opposite to the first surface of the second member, and the first and second surfaces of the display device are respectively the second surfaces of the first and second members.

16. The display device of claim 15, wherein the first surfaces of the first and second non-folding areas face each other, and the first surfaces of the first and third non-folding areas face each other.

17. The display device of claim 15, wherein the first surfaces of the first and second non-folding areas face each other, and the second surfaces of the first and third non-folding areas face each other.

18. A display device comprising:

a display panel;

a first member disposed on the display panel;

a second member disposed on the display panel;

a first adhesive layer disposed between the display panel and the first member; and a second adhesive layer disposed between the display panel and the second member, wherein spacers are disposed in the second adhesive layer, the first and second adhesive layers each include a pressure sensitive adhesive, the display device is configured to fold, and when the display device is in a folded state, a thickness of the second adhesive layer is smaller in curved parts of the display device than in non-curved parts of the display device, and a diameter of each of the spacers is about 60% to about 96% of the thickness of the second adhesive layer in the non-curved parts of the display device, wherein the second adhesive layer has a first surface that faces the display panel and a second surface that is opposite to the first surface of the second adhesive layer, and when the display device is in the folded state, the spacers are in contact with the first and second surfaces of the second adhesive layer, in a folding area of the display device.

19. The display device of claim 18, wherein the spacers are in contact with one another.

* * * * *